United States Patent [19]
Sato

[11] Patent Number: 5,163,635
[45] Date of Patent: Nov. 17, 1992

[54] FISHING REEL HOUSING AN IMPROVED LEVER ARM CLUTCH CONTROL

[75] Inventor: Jun Sato, Sakai, Japan

[73] Assignee: Shimano Industrial Co., Ltd., Sakai, Japan

[21] Appl. No.: 618,801

[22] Filed: Nov. 28, 1990

[30] Foreign Application Priority Data

Nov. 30, 1989 [JP] Japan .................. 1-139840

[51] Int. Cl.⁵ .......................................... A01K 89/015
[52] U.S. Cl. ................................................. 242/261
[58] Field of Search .............. 242/259, 260, 261, 262

[56] References Cited

U.S. PATENT DOCUMENTS

| | | | |
|---|---|---|---|
| 4,014,422 | 3/1977 | Morishita | 242/261 X |
| 4,168,812 | 9/1979 | Karlsson | 242/261 |
| 4,512,536 | 4/1985 | Sato | 242/261 |
| 4,575,024 | 3/1986 | Kaneko | 242/261 |
| 4,674,699 | 6/1987 | Fukushima et al. | 242/261 |
| 4,697,760 | 10/1987 | Aoki | 242/261 |
| 4,824,046 | 4/1989 | Emura et al. | 242/261 |
| 4,850,550 | 7/1989 | Aoki | 242/261 |
| 4,919,360 | 4/1990 | Roberts | 242/261 X |

FOREIGN PATENT DOCUMENTS 60-36077  3/1985  Japan .

Primary Examiner—Daniel P. Stodola
Assistant Examiner—John P. Darling
Attorney, Agent, or Firm—Dickstein, Shapiro & Morin

[57] ABSTRACT

A fishing reel is provided with an operational line for extending an operational stroke of a clutch control member and transmitting the extended stroke to a clutch mechanism while retaining a compact reel structure. The clutch control member is positioned rearwardly of a reel and is vertically operable for disengaging the clutch mechanism. An arm member is provided which has a rearward end pivotably supported by a reel body rearwardly of the control member, a forward end connected to the clutch mechanism, and an intermediate operated portion for receiving an operational force from the control member.

2 Claims, 5 Drawing Sheets

FISHING REEL HOUSING AN IMPROVED LEVER ARM CLUTCH CONTROL

BACKGROUND OF THE INVENTION

1. Field of the Invention

The present invention relates to a fishing reel comprising a control member positioned rearwardly of a spool to be vertically operable for disengaging a clutch mechanism mounted in a transmission path between the spool and a handle, and more particularly to an improvement of a structure for operating the clutch mechanism.

2. Description of the Prior Art

An example of the conventional fishing reels having the control member arranged as noted above is disclosed in Japanese Utility Model Application "Kokai" No. 60-36077, in which a bell crank lever is disposed between the control member and the spool in side view for transmitting an operational force from the control member to the clutch mechanism through the lever.

However, such a conventional structure having the lever disposed between the control member and the clutch mechanism is required to secure a space for arranging the lever in the vicinity of the clutch mechanism and a space for allowing the lever to oscillate, which prevent the attainment of a compact reel as a whole.

In addition, since the clutch mechanism mounted in the transmission line is required to set an operational stroke of a clutch sleeve or the like to a relatively large value for a reliable operation even if the compact reel can be realized, it is necessary to provide a mechanism for extending an operational stroke of the control member.

The above noted Japanese reference discloses a link member mounted on a controlled line of the clutch mechanism for extending the operational stroke from the lever.

SUMMARY OF THE INVENTION

An object of the present invention is to provide a fishing reel having an operational line for extending an operational stroke of a control member and transmitting the extended stroke to a clutch mechanism as well as attaining a compact structure as a whole.

The present invention is characterized by a fishing reel comprising a control member for disengaging a clutch mechanism, and an arm member having a rearward end pivotably supported by a reel body rearwardly of the control member, and a forward end connected to the clutch mechanism, the arm member being provided with an operated portion defined in an intermediate portion thereof for receiving an operational force from the control member. An operation and an effect are set forth below.

As seen from FIG. 1, since a distance between a pivotal axis P and the forward end of the arm member 30 is larger than a distance between the pivotal axis P and the operated portion B, the clutch mechanism C is operated (disengaged) with a larger stroke than the operational stroke of the control member 6 when the control member 6 is pressed downwardly. Furthermore, the axis P of the arm member 30 lies in a position originally defined as a dead space, which prevents the operational line from being increased in dimension resulting from providing the arm member 30.

Thus, the operational line for extending the operational stroke of the control member and transmitting the extended stroke to the clutch mechanism can be effectively realized without affecting the compact structure of the whole reel.

Other objects, features and advantages of the present invention will be apparent from the following description referring to the accompanying drawings.

BRIEF DESCRIPTION OF THE DRAWINGS

The drawings show fishing reels embodying the present invention, in which.

DESCRIPTION OF THE PREFERRED EMBODIMENTS

Figure 1:
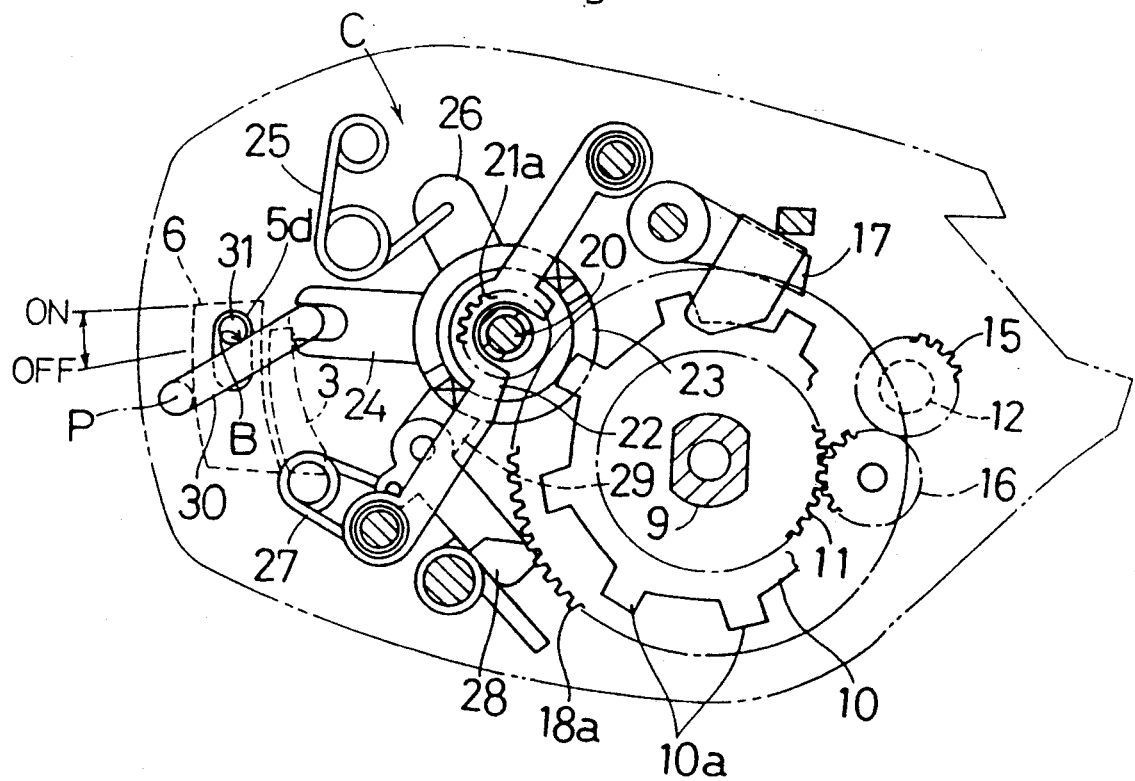
FIG. 1 is a vertical section of a fishing reel with a clutch being in an engaged position.
Figure 2:
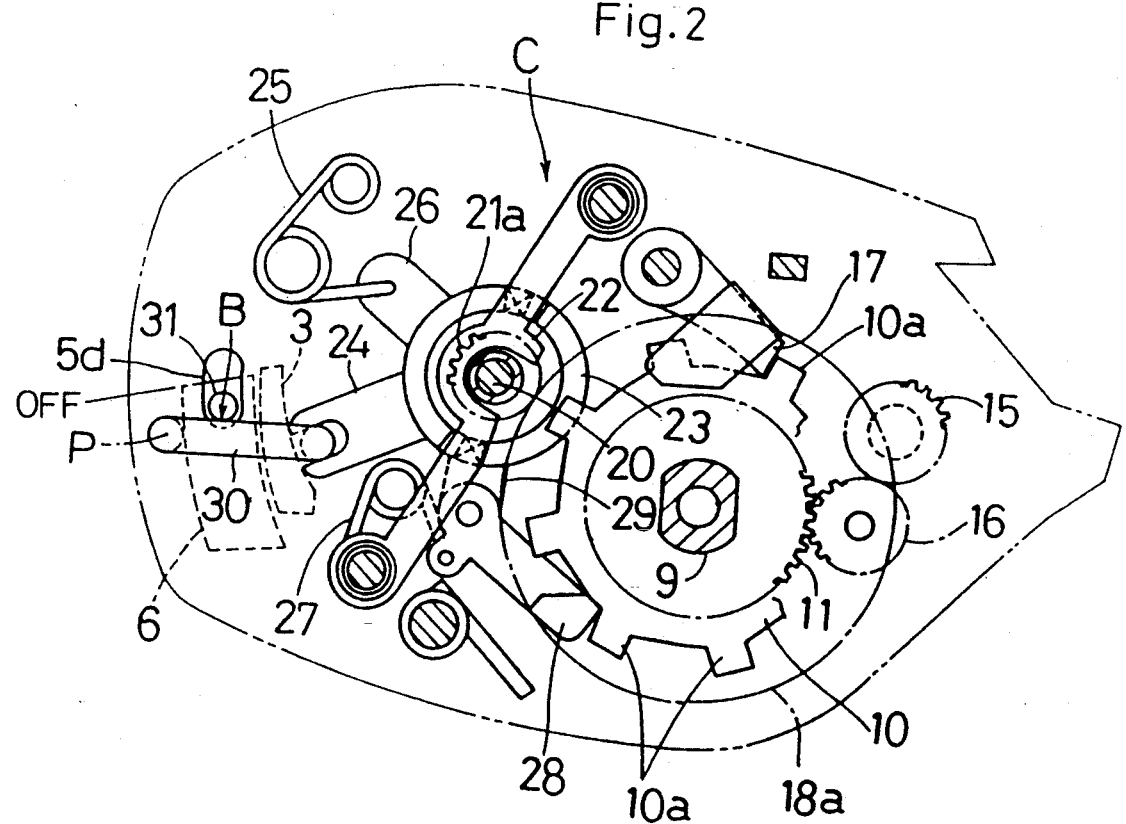
FIG. 2 is a vertical section of the reel with the clutch being in a disengaged position.
Figure 3:
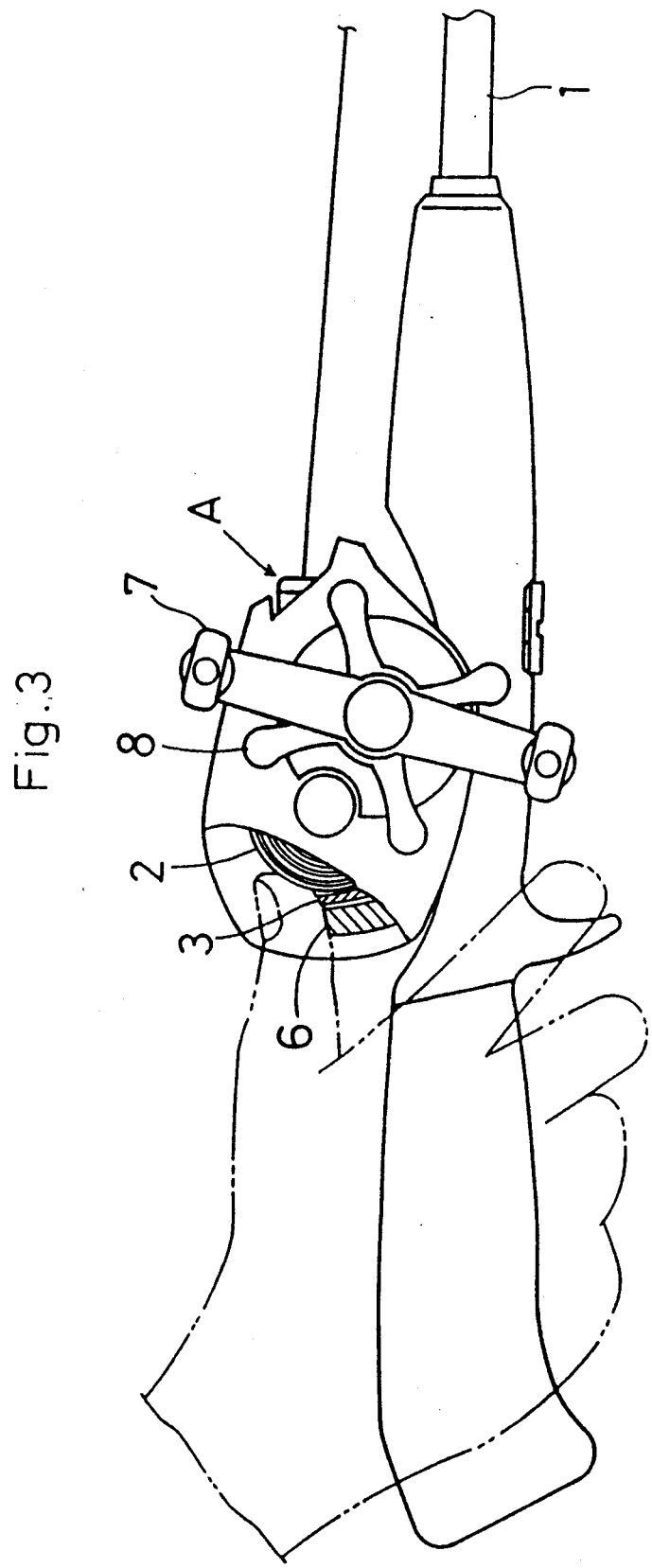
FIG. 3 is a partially broken away side view of the reel in a use condition.

A fishing reel embodying the present invention will be described below referring to the accompanying drawings.

As seen from FIGS. 1 through 6, a fishing reel for use as attached to a rod 1 comprises a level wind mechanism A disposed in a front portion, a spool 2 in a middle portion, and a thumb rest 3 in a rear portion, all held between right and left side members 4 and 5. A pressing knob 6 acting as a control member is disposed further rearwardly of the thumb rest 3 to be pushed downwardly for setting the spool 2 to a free rotation condition. A winding-up handle 7 and a star-like drag adjuster 8 are disposed outwardly of the right side member 5.

Figure 4:
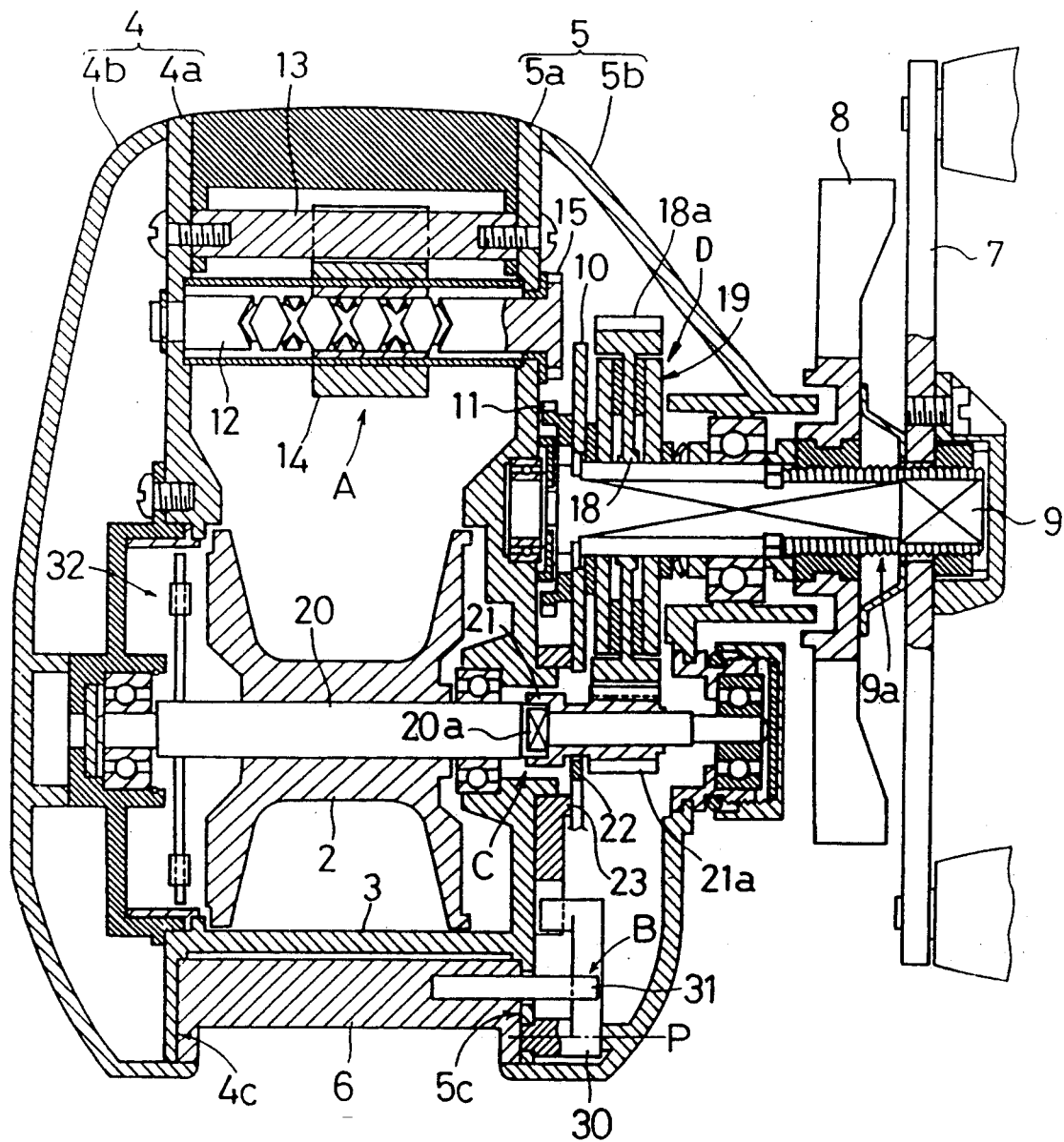
FIG. 4 is a plan view in cross section of the reel with the clutch being in the engaged position.
Figure 5:
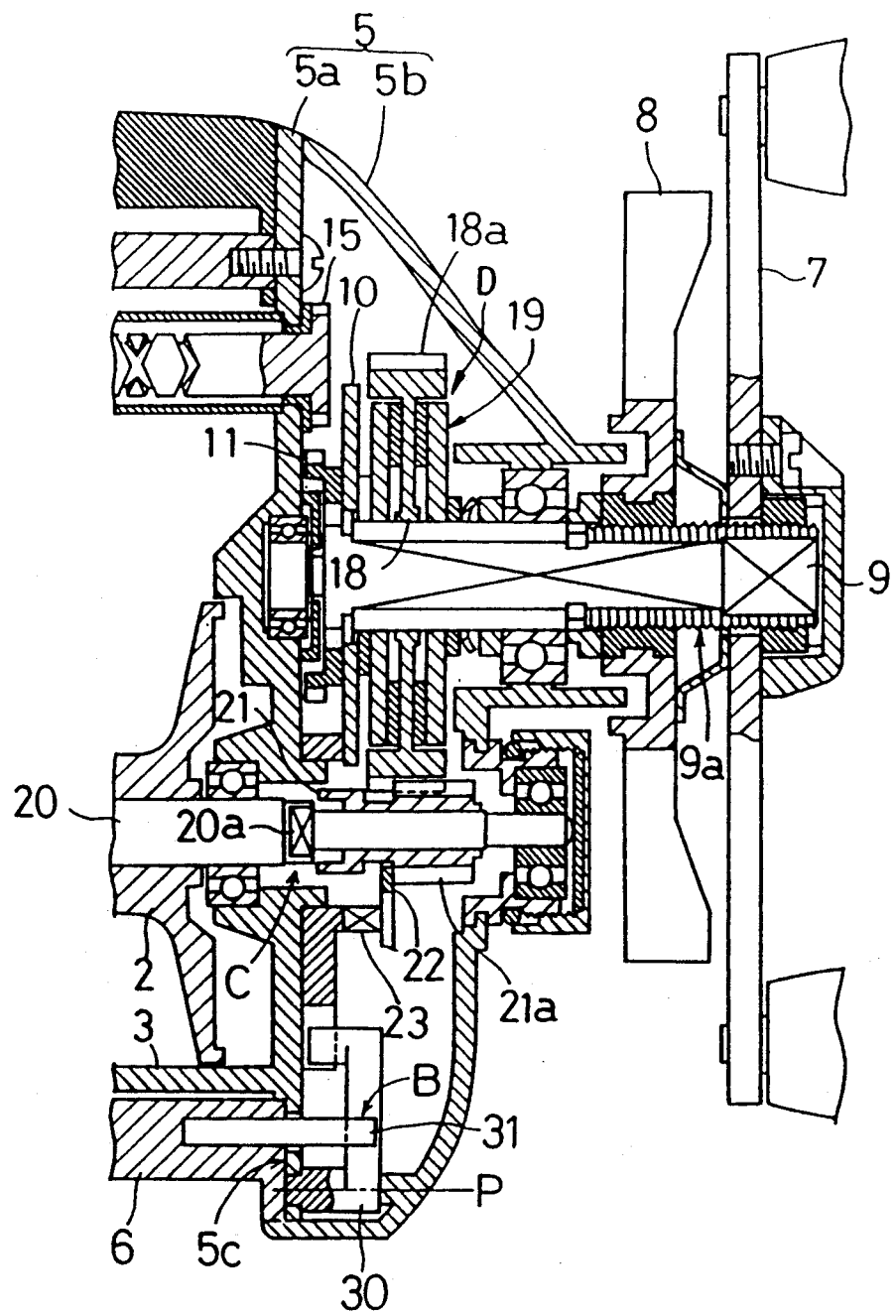
FIG. 5 is a fragmentary section of the reel with the clutch being in the disengaged position.
Figure 6:
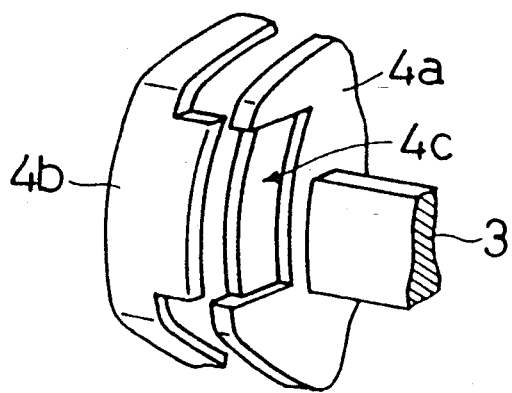
FIG. 6 is a perspective view of guide grooves of a pressing knob.

As shown in FIG. 4, the right and left side members 4 and 5 include side plates 4a and 5a and outer wall members 4b and 5b surrounding the side plates 4a and 5a, respectively. A rotary shaft 9 connected to the handle 7 extends through a space between the right side plate 5a and the outer wall member 5b.

The drag adjuster 8 is screwed to a screw portion 9a defined on an outer end portion of the rotary shaft 9. The rotary shaft 9 includes at an inner end portion a drag mechanism D including friction plates 19, a ratchet wheel 10, and an interlock gear 11 for transmitting drive to the level wind mechanism A.

The level wind mechanism A reciprocates a fishing line guide member 14 along a guide rod 13 by rotating a traverse shaft 12. The drive from the interlock gear 11 is transmitted to a gear 15 mounted on an end portion of the traverse shaft 12 through an intermediate gear 16.

The ratchet wheel 10 defines a plurality of radially projecting teeth 10a on an outer periphery thereof. A pawl member 17 is mounted in the vicinity of the ratchet wheel 10 to be urged in a direction for engaging one of the teeth 10a whereby the ratchet wheel 10 functions to lock the rotary shaft 9 against reverse rotation.

An idling disk 18 provided with an output gear 18a on an outer periphery thereof is supported by the rotary shaft 9. The drag mechanism D includes friction plates 19 sandwiching the idling disk 18 and fitted on the rotary shaft 9 for torque transmission, thereby to adjust a friction force by adjusting a pressing force through a turning operation of the drag adjuster 8.

The spool 2 includes a support shaft 20 to be rotatable in unison and defining an engaging portion 20a in an intermediate portion thereof. A slide member 21 engageable with the engaging portion 20a is freely rotatably supported by the support shaft 20. Since an input gear 21a mounted on the slide member 21 is meshed with the output gear 18a of the idling disk 18, the handle 7 is rotated, with the slide member 21 engaging the engaging portion 20a, to rotate the spool 2 for winding up the fishing line.

In this connection, the level wind mechanism A equalizes a winding amount of the fishing line sideways along the spool 2 while the ratchet wheel 10 prevents the handle 7 from being operated in a reverse direction.

The slide member 21 combines with the engaging member 20a to form a clutch mechanism C. When attempting to throw out the fishing line, the rod 1 is swung after the slide member 21 is set to a position shown in FIG. 2, i.e. a declutching position, thereby to throw out a weight or a lure, which imparts tension to the fishing line. As a result, fishing line is drawn out from the spool 2.

According to the present fishing reel, the setting of the spool 2 to the free rotation condition, i.e. a declutching operation, is carried out by pressing the pressing knob 6 downwardly.

More particularly, the pressing knob 6 is vertically operable along vertically elongated guide grooves 4c and 5c. A rotary cam 23 is mounted coaxially with the support shaft 20 for slidably moving a shifter 22 engaging the slide member 21. The rotary cam 23 is provided with a control arm 24.

The rotary cam 23 further includes a first arm portion 26 for receiving the urging force of a first toggle spring 25, and a second arm portion 29 for pivotably supporting a kick pawl 28 to be swingable under the urging force of a second toggle spring 27.

In side view, an arm member 30 has a rearward end supported by the side plate 5a to be pivotable about a horizontal axis P rearwardly of the pressing knob 6, and a forward end connected to the control arm 24. A pin 31 extending through a side face of the pressing knob 6 is in contact with an upper face (referred as an operated portion B) of an intermediate portion of the arm member 30 through an opening 5d defined in the right side plate 5a. Thus, when the pressing knob 6 is pressed downwardly, an operational stroke thereof is extended through pin 31 acting as a pressing position to the arm member and by the arm member and transmitted to the control arm 24 thereby to disengage the clutch mechanism C.

The clutch mechanism C is maintained in the declutching position under the urging force of the first toggle spring 25. When the handle 7 is operated in a winding-up direction, the kick pawl 28 is returned to a position by the ratchet wheel 10 to engage the clutch mechanism C.

A centrifugal brake 32 for preventing a backlash of the spool with release of the fishing line is mounted inside the left side case 4.

Besides the foregoing embodiment, the control member and the arm member may be interconnected by a pin and the like. The control arm may be supported by a reel body through arm means or linkage means.

What is claimed is:

1. A fishing reel comprising:
   a reel body;
   a spool rotatably supported within said reel body;
   a clutch mechanism mounted in a force transmission path between said spool and a handle, said clutch mechanism including a rotary cam for operating said clutch mechanism by rotation, said rotary cam having a control arm;
   a clutch control member for operating said clutch mechanism, said clutch control member being positioned rearwardly of the spool and mounted to be vertically movable relative to a body of the spool, said control member having a vertically movable pressing portion for transmitting a pressing operation force; and
   an arm member comprising:
   (1) a rearward end pivotably connected to said reel body rearwardly of said pressing portion, said rearward end of said arm member being non-displaceable in forward and rearward directions relative to said reel body;
   (2) a forward end which is connected to said clutch mechanism, said forward end being pivotably connected to said rotary cam through said control arm, said forward end being displaceable in the forward and rearward directions relative to said rotary cam; and,
   (3) an intermediate operated portion having a pressed portion that receives said pressing operation force from said pressing portion, wherein a downward operational stroke of said intermediate operated portion is amplified by said arm member such that an amplified operational stroke is transmitted to said control arm to pivot said control arm and thereby disengage said clutch mechanism, and wherein said pivotably connected rearward end of said arm member is located behind said pressed portion of said arm member.

2. A fishing reel according to claim 1, wherein a moving direction of said control member extends substantially normal to said arm member.

* * * * *